March 17, 1936. E. W. DUNBAR 2,034,091
FOOTWEAR AND METHOD OF MAKING
Filed Dec. 26, 1931 5 Sheets-Sheet 1
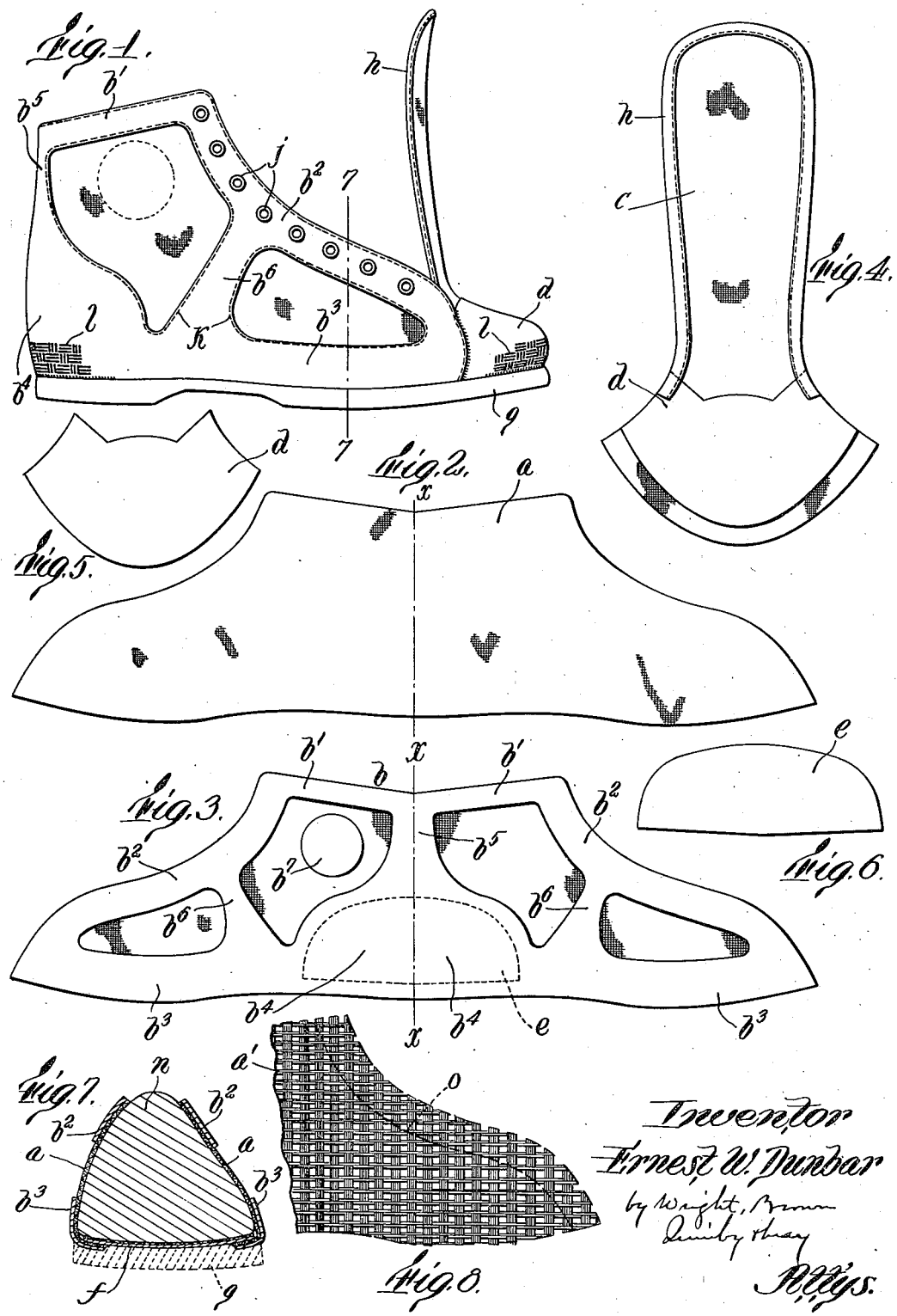

March 17, 1936.  E. W. DUNBAR  2,034,091

FOOTWEAR AND METHOD OF MAKING

Filed Dec. 26, 1931  5 Sheets-Sheet 2

Inventor:
Ernest W. Dunbar
by Wright, Brown, Quinby & May
Attys.

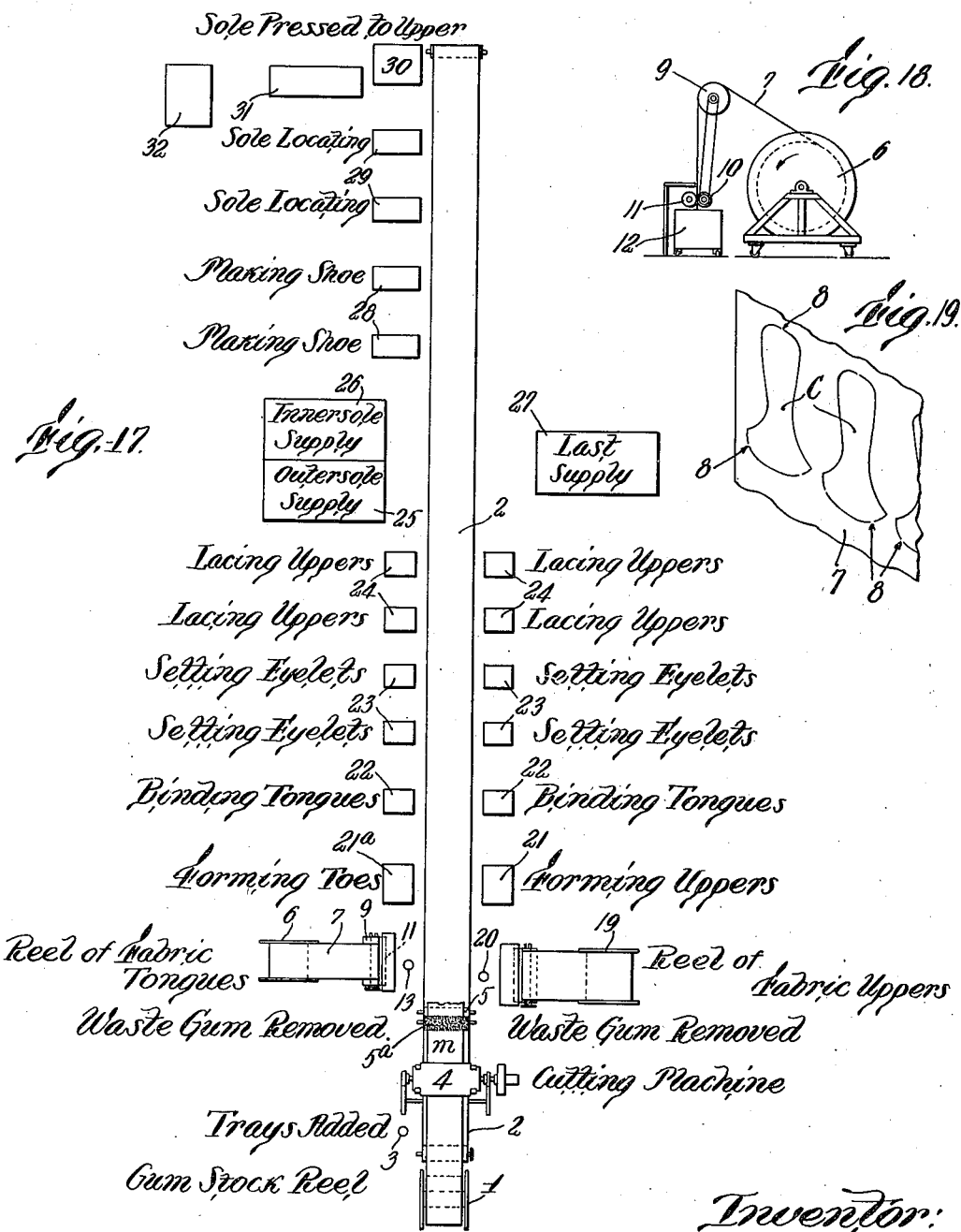

March 17, 1936.  E. W. DUNBAR  2,034,091
FOOTWEAR AND METHOD OF MAKING
Filed Dec. 26, 1931  5 Sheets—Sheet 5

*Fig. 23.*

Patented Mar. 17, 1936

2,034,091

UNITED STATES PATENT OFFICE 2,034,091

FOOTWEAR AND METHOD OF MAKING

Ernest W. Dunbar, Hudson, Mass., assignor to Cambridge Rubber Company, Cambridge, Mass., a corporation of Massachusetts Application December 26, 1931, Serial No. 583,301

18 Claims. (Cl. 12—142)

This invention relates to footwear of composite rubber and textile fabric construction, particularly shoes of the character known as tennis or sport shoes having a rubber sole and an upper of canvas with trimming parts of rubber composition. Such trimming parts commonly include a toe cap, foxing, eyelet stays, back stay, and counter, etc., and an ankle patch on that side of the upper which covers the inner side of the foot. The object of the invention is to produce an improved shoe of this character and at the same time to simplify its construction and reduce the cost of making it. The invention comprises the improved shoe as a new manufacture, and my new method of producing it, including all novel steps and combinations of steps.

In order better to explain the novelty and advantage of the invention, I will now briefly describe the prior commercial practice of making rubber trimmed sport shoes, as a basis for comparison. This practice is to cut out first the canvas uppers from cloth which has usually been combined, in the piece, by cement before cutting, with a lining, and then to cut from sheet rubber, or gum stock, in separate pieces, the various parts which compose the trimming; i. e., the eyelet stays, arch support, heel stays, ankle patch, etc. These trimming parts, or overlays, are then stitched to the canvas upper. After that the composite upper so made is sent to the making room, where it is lasted to the inner sole, the foxing cement, foxing and binder are successively applied, and finally the unvulcanized rubber outer sole is placed on the bottom of the lasted shoe. Finally the shoe is vulcanized.

The stitching operations have formed approximately half of the cost of making shoes by the above described practice. An important object of my invention has been to avoid this item of cost by eliminating all, or nearly all, the stitching room operations. Other objects have been to improve the fit and strength of the shoe upper; to enable types of fabric to be used in such uppers which have not been possible of use heretofore; and to enable the entire procedure from the dieing out of the trimming parts to the final vulcanization of the shoe to be carried out in direct continuity and with a minimum of intermediate handling.

One phase of the invention consists in the provision of a bond of substantially pure rubber, instead of sewed seams, between the fabric and rubber parts of the upper, which is so interlocked with the strands and fibers of the fabric portion of the upper as to be indestructible by any force less than sufficient, or nearly so, to rupture the rubber itself. Such bond is obtained by impregnating the fabric with pure rubber latex, or a compound thereof, which unites with the rubber trim, or an adhesive compound applied to the trim, and upon vulcanization, becomes integral therewith. However, this is not a limitation upon other phases of the invention, later described, which may be employed, and are equally useful, with any bonding medium between the fabric and the rubber parts of the shoe.

Another factor of the invention is the provision of a compound on the under side of the trim (i. e., the side next to the fabric) which will not become prematurely cured but becomes highly active at vulcanizing temperature in the presence of anhydrous ammonia. This compound makes a more powerful bond between the trim and the rubber deposited from latex in the fabric. However, it is not an essential of the broadest protection claimed herein, although being claimed as a useful and valuable factor.

Another phase of the invention is the method of dieing out all trimming parts in one operation from a sheet of suitable rubber composition; and the embodiment in the shoe of integrally united trimming parts which may be conveniently called for the purpose of this description a "skeleton trim", which has a structural mechanical advantage in the finished shoe.

Still another feature of the invention consists in the procedure of dieing out the trimming parts or the skeleton trim and assembling the other parts of the shoe therewith in a progressive series of steps constituting a continuous operation.

Referring now to the drawings which illustrate my improved shoe and my improved methods of making it;—

Fig. 1 is a side elevation of the shoe;

Fig. 2 is a plan view of the fabric upper, or rather the fabric constituent of the upper, prior to union with the rubber trim;

Fig. 3 is a similar view of the upper after union of the fabric and rubber parts and before application of the tongue;

Fig. 4 is an elevation of the fabric tongue and rubber toe cap of the shoe united together;

Fig. 5 is a view of the rubber toe cap alone as cut from the sheet;

Fig. 6 is a similar view of a rubber counter stiffener called in the art a "junior";

Fig. 7 is a cross section taken through the shoe on line 7—7 of Fig. 2 and showing a last inside of the shoe;

Fig. 8 is a partial view similar to Fig. 2 of an open mesh fabric upper, the successful use of which in a shoe of the character described is made possible for the first time by my invention;

Figure 14:
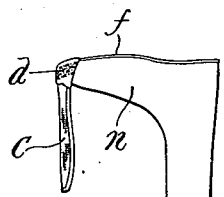
Figure 15:
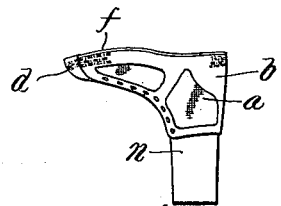
Figure 16:
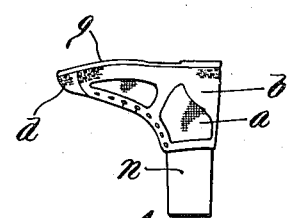
Figure 20:
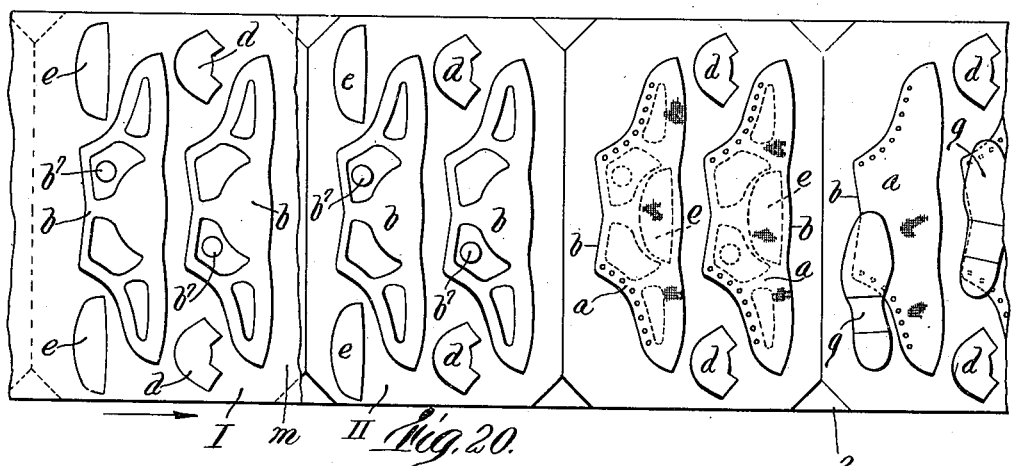
Figure 21:
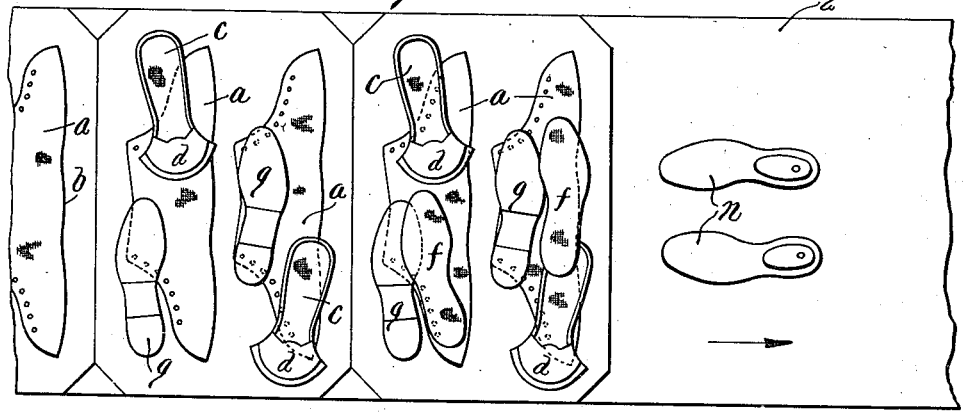
Figure 22:
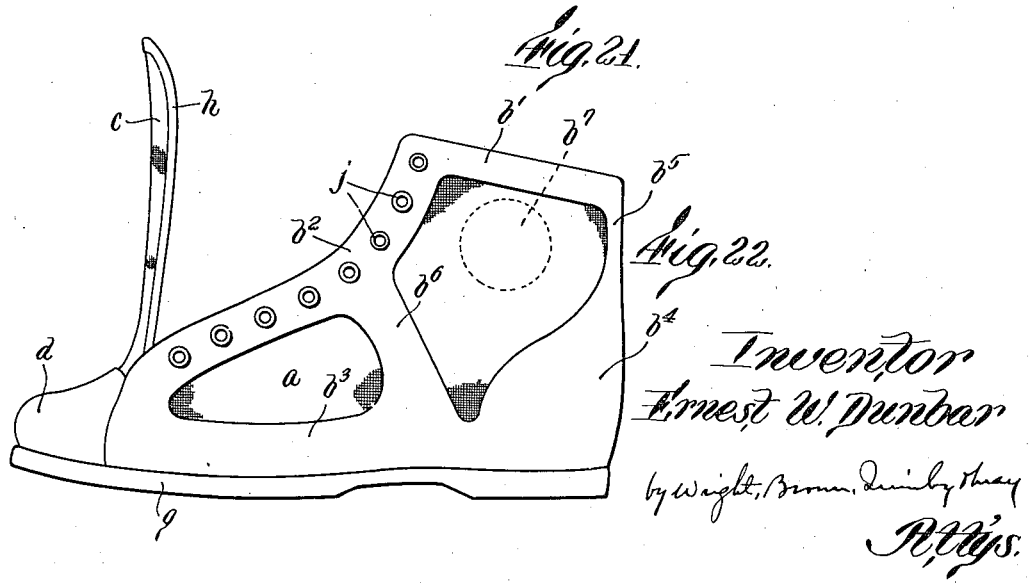

Figs. 9-13 inclusive represent successive steps in the assembling, according to my preferred method, of the parts of my improved shoe;

Figs. 14, 15 and 16 represent successive steps in lasting the shoe;

Fig. 17 is a diagrammatic plan view further illustrating the sequence of steps of my novel method;

Fig. 18 is an elevation of one of the machines by which fabric parts of the shoe are supplied to the operators;

Fig. 19 is a fragmentary perspective view of a strip of fabric from which the shoe tongues are taken;

Figs. 20 and 21 are views similar to Figs. 9-13 inclusive showing successive steps in an alternative embodiment of my shoe making method;

Fig. 22 is an elevation of the finished shoe so made;

Fig. 23 is a view similar to Fig. 17 showing the steps of the alternative method.

Referring first to Figs. 1-7 inclusive, which illustrate one style of shoe made according to this invention, the major part of the upper is composed of a piece $a$, of duck or other textile fabric, or possibly non-textile material suitable to be used in shoes of the character herein referred to, which is cut to any dimensions and outlines as required for the size and style of any particular shoe. With this fabric upper is combined a trim of rubber composition comprehensively designated as $b$, and composed of edge straps or stays $b'$, $b'$, eyelet stays $b^2$, $b^2$, foxings $b^3$, $b^3$, quarter or counter $b^4$, back stay $b^5$, arch supports or stays $b^6$, $b^6$, and ankle patch $b^7$. Preferably all of these parts, except the ankle patch, are made in one piece. However, either or both the fabric and the trimming members may be divided in two on the line $x-x$ of Figs. 2 and 3 in order either to enable the upper to be fitted better to the last, or to facilitate handling the parts of shoes of the large sizes, but when the rubber trim is thus made in halves all the parts of each half are preferably integral. Nevertheless, from the point of view of one aspect of the invention, i. e., the new mode of applying the rubber trim to the fabric and assembling the parts of the shoe, this integral union of the parts of the trim is not a primary essential. The toe part and tongue of the shoe are formed by a separate piece $c$ of fabric, having a width and outline at its lower end suitable to envelop the toe of the last and underlap the forward edges of the upper; to the lower end of which is attached on the outer side a toe cap $d$ of rubber composition. A counter stiffener or so-called junior $e$ is confined between the fabric and the part $b^4$ of the rubber trim. An inner sole $f$, (Fig. 7) is embraced at its edges by the inwardly turned flange or edge portions of the upper and toe cap, and these parts are covered by an outer sole $g$.

The rubber parts above described are made of an unvulcanized, but vulcanizable, rubber composition, which may be of any character known to the art and known to be suitable for the purpose indicated. Such compositions are commonly called gum by the workers in this art, and I will use that term in the following description for brevity. Preferably the sheet of gum composition is backed or reinforced on one side by a base of thin or light fabric sheeting in order to prevent the gum from spreading out and becoming distorted when pressed against the fabric, and also to provide staying strength for the eyelets $j$ which are set into the lacing edges of the upper. But my protection is not limited to the use or presence of such a base. The fabric covered side of the gum trim, when a sheeting base is provided, comes next to the upper fabric.

No stitching is employed in uniting the gum and fabric parts of the upper, and the only stitching in the entire shoe is that which secures a binding strip $h$ to the edges of the tongue; but even that may be omitted if desired. The broken lines shown in Fig. 1 following the outlines of the trimming parts, and designated $k$, are not stitches, but merely ornamentation imitating stitches which are formed by the plates used in pressing the upper and trim together.

Before the gum and fabric are united, the fabric is provided with a facing or content of vulcanizable rubber to effect a bond, over its whole surface or so much of it as receives the trim. Such rubber content may be derived from a preparation of rubber latex, from a cement or other solution of rubber, or otherwise.

When the gum trimming material is provided with a base of sheeting, the latter is preferably also impregnated or coated with a fluid preparation of vulcanizable rubber, and dried, prior to its union with the gum in order both to prevent fraying out of its cut edges and also effect a firmer bond with the gum and the upper fabric.

Union between the fabric body of the upper and the trimming is effected by the coalescence of the rubber residue thus put into the fabric with the rubber of the trimming, and vulcanization of the coalesced rubber. Such union may be effected with the gum trim directly, but I prefer to use an intermediate adhesive compound between the fabric and the trimming material. Such compound is composed mainly of pure rubber and contains small quantities of known vulcanizing agents and a low temperature accelerator. It is substantially free from fatty acids and will not cure at such low temperatures as those in work rooms and storage rooms, whereby danger of premature curing during the manufacture of the shoe is eliminated, but it is highly active at the temperature of vulcanization in the presence of anhydrous ammonia. The accelerators referred to are commercial products available in the market under the trade name of Captax and other names. They are substantially neutral and inert; but the compound containing such an accelerator, when put in the vulcanizing tank or chamber in an atmosphere containing anhydrous ammonia, and heated to vulcanizing temperature, becomes strongly basic and the accelerator becomes highly active. The compound is spread in a calendering machine over the surface of the gum sheet, or on the outer side of the fabric base, when such base is provided. Whenever used it provides an intermediate bond between the trimming gum and the rubber in the fabric upper.

The assembled gum and fabric members are pressed upon by a press plate which, on the face next to the rubber, may be engraved so as to emboss and ornament the rubber with desirable designs, such as the imitation stitching shown at $k$ and the ornamentation at $l$. The pressure so applied, together with application of moderate heat to soften the rubber, causes coalescence between the gum and the rubber residue in the upper fabric.

In the preferred method of assembling the parts of the shoe (see Figs. 9-17), a sheet or strip of the gum stock is provided on a reel $i$, called a stock reel, from which it passes to the adjacent end of an endless conveyor belt 2. The stock sheet is preferably of the three ply construction previously described, i. e., gum, base fabric, and adhesive compound, but may be gum only. An operator at a station indicated at 3 places boards or trays on the conveyor beneath the stock sheet (the sheet being shown at I, and a tray at II in Fig. 20), such boards being conveniently pieces of hard fiber of dimensions large enough to carry the parts of a pair of shoe uppers laid flat. The conveyor advances the tray and gum sheet on to the table of a die press 4, and pauses while the press operates. Such press is equipped with cutting dies adapted to cut at one blow all the rubber pieces of an upper, or of one or more pairs of uppers. In the present illustration, as shown in section I of Fig. 20, the die cuts in the gum stock sheet $m$ the outlines of two skeleton trims $b$, (including the outlines of the cut-outs therein), two ankle patches $b^7$, two toe caps $d$, and two juniors $e$. The forward end of the stock sheet is here shown broken away.

This dieing out operation does not sever the stock sheet all the way across but leaves it intact at the edges and in parts between the trims. The waste or scrap remainder of the sheet passes beneath a brush roll 5a and over a closely adjacent guide roll 5, under the pull of any suitable propelling means to a receiver not shown, leaving the useful parts intact and undisturbed on the tray, as the conveyor progresses in a further step. There is enough cohesion in the gum, and adhesion to the trays, to enable the waste to be thus removed without disturbance or distortion of the useful pieces; and in addition the brush roll 5a, which revolves and brushes the stock near the point where the scrap is led away helps to keep these pieces in place, by the pressure of its bristles on the cut out parts. Waste parts which have been completely severed from the stock are then removed by hand. A further step of the conveyor brings the tray beside a reel 6 containing a strip of rubber-treated textile fabric 7 (see also Fig. 19), from which tongues have been almost completely severed, with intact threads at only a few points 8 of their outline. This fabric passes from the reel over a guide roll 9 (Fig. 18) between feed rolls 10, 11 and into a waste receptacle 12. While the fabric passes from the guide roll to the feed roll, the operator at 13, or a number of operators, may break out the severed tongues and lay two of them on each tray. At the opposite side of the conveyor is a reel 19 of rubber-treated fabric from which the fabric uppers have been substantially severed in the same way as the tongues, and from which the uppers are taken by an operator at 20 and laid on the trays. The same or a preceding or following operator picks up the juniors $e$ and places them in proper position on the skeleton pieces $b$, and lays an upper fabric over each of the gum trims. The proper locations for these parts may be indicated by marks made in dieing them out. As thus far described, the parts are assembled in the manner shown in Figs. 9 and 10, which respectively show opposite sides of the assemblages.

At the next stage an operator on one side of the conveyor places the assembled uppers in a forming press 21, where the fabric and gum trim are pressed together between suitable plates, which may be engraved so as to impress or emboss a desired ornamentation in the gum. At the corresponding station on the opposite side of the conveyor, the tongues with their gum toe caps are pressed in a toe cap forming machine 21a with a corresponding effect. These presses are called forming machines in the practical art because they usually give to the gum a desired form of ornamentation or embossing on the surface. They are heated to a moderate degree, by electric heating units under their supporting tables or other suitable means, so as to soften the rubber and obtain quicker and more complete coalescence of the originally separated rubber in the fabric and trim. The degree of heat here is well below vulcanizing temperature, not over 200° F. at the most, and preferably between 130° and 150°. Such forming machines may be duplex or multiple so as each to form a pair, or more, of uppers or tongues respectively in one operation; or there may be a plurality of machines for the same purpose. Beyond the forming machines are sewing machines 22 where bindings are sewed on the edges of the tongues. But the relative order of forming and sewing steps may be reversed within the scope of the invention, and the tongue stitching step may be dispensed with in case the binding tape is omitted or the edges of the tongue are bound by other means than a stitched on tape.

The assembled uppers are next set with eyelets in their lacing edges, and I have shown at 23 in Fig. 17 a number of eyeleting machines in order to indicate that there may be as many such machines as necessary to set eyelets in the uppers as fast as they are supplied from the preceding steps. That is, the operations are geared up to the speed of cutting at the die press 4, and sufficient machines and operators are supplied at later stations to keep step. The uppers are now in the condition shown in Fig. 11.

Figures 9, 10, 11, 12, 13:
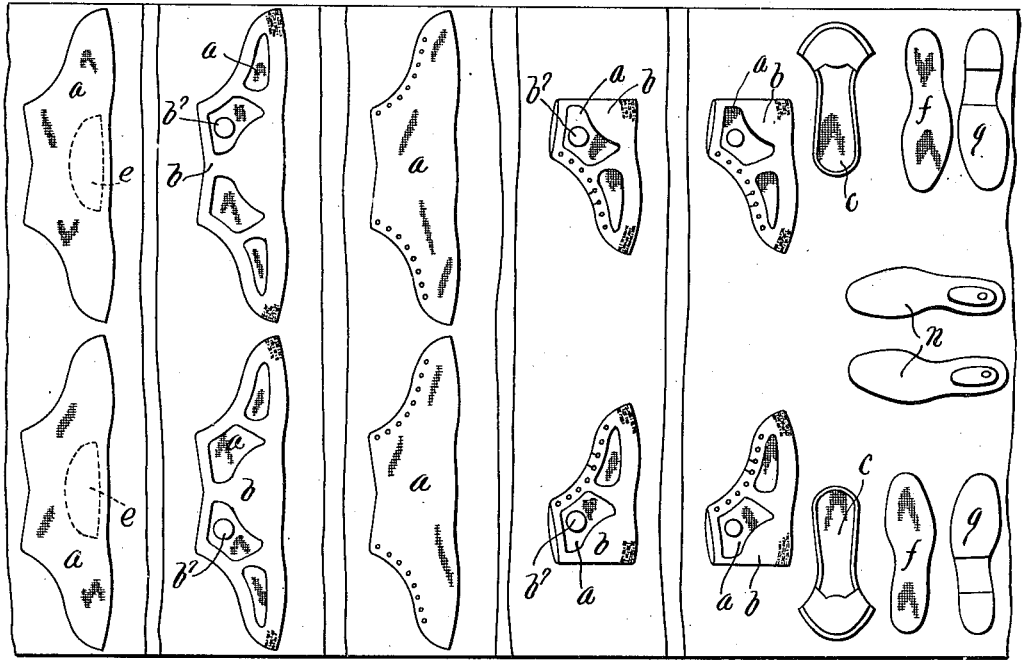

Next they pass to the operators of lacing machines 24, who cause temporary lacings to be placed in some of the eyelets, as shown in Fig. 12, to tie the sides of the uppers into position to be lasted.

It will be understood that after removal of the uppers and tongues, and the performance of operations on them by the machines referred to, the operators of these machines return them to their appropriate trays.

In further stages of progress, operators take inner soles $f$ from a supply 26, outer soles $g$ from a supply 25, and lasts $n$ from a last supply 27, and place them on the trays, as indicated by Fig. 13.

The trays then advance to shoe making stations 28, of which there are a sufficient number, and a sufficient number of operators, to assemble the disconnected parts. In the shoe making operation the toe end of the tongue is first placed against and laid around the toe of the last $n$, as shown in Fig. 14. The inner sole and upper are then placed on the last and the edges of the upper are pulled around the bottom of the last and pressed against the inner sole by hand, while the forward edges of the upper are overlapped on and pressed against the gum toe cap. In this lasting operation cement may be used, as usual in the lasting of rubber footwear, to cause sufficient adhesion between the upper and inner sole. At further stations, 29, the outer sole is laid on the bottom of the shoe, at station 30 the shoe is placed in the press and the outer sole pressed firmly on the inner sole and the turned in edges of the upper and toe cap. The shoe bottoms are then rolled at station 31, by passing a roller around the edges of the outer sole with pressure against the sides of the last, to make sure that all gaps and cracks between the sole and upper are closed up. This completes the shoe except for vulcanization. 32 represents a truck on which the finished shoes are placed by a final inspector, and by which they are carried to the vulcanizer. The vulcanizing reaction is then carried out by heat with the articles surrounded by an atmosphere containing ammonia gas.

It is within my contemplation, and the scope of this invention, to dispense with the use of trays as means for supporting the gum stock while being cut in the die press and to use instead a conveyor which in itself is hard and dense enough to receive the impact of the cutting dies without injury. I may make such a conveyor of hard fiber or sheet metal having sufficient flexibility to pass around large guide rolls at the ends of the conveyor, and provide rolls of such diameter that conveyors of this character may pass around them without being injuriously strained. The conveyor of this character may terminate at the last of the stations where lacings are placed in the uppers, and there meet a second conveyor to which the laced uppers (which are then in the condition shown in Fig. 12) are transferred, and on which the outer and inner soles and the lasts are placed in groups to be carried to the shoe making stations. Trays may be used on the forwarding conveyor to assist in grouping the disassembled parts of the same pair of shoes, and the lasts therefor; but they need not be and spaces for such groups may be marked off on the surface of the forwarding conveyor.

The alternative method illustrated in Figs. 20, 21, and 23 is like that previously described in dieing out the gum parts and assembling the fabric and trimming parts of the upper together, but differs in certain particulars thereafter. So far as the steps and means are similar, the same reference characters are used in both Figs. 17 and 23. The fabric parts (i. e., uppers and tongues) are provided, in fully severed condition and separated from the waste fabric, in supply containers 33 and 34 from which they are removed by operators and laid on the trays carrying the cut-out gum parts, applied to such parts, and pressed in forming machines. Eyelets are set in the uppers at a convenient stage in the process. Outer soles and inner soles are taken from supply containers 35, 36, 37, etc. and placed successively on the trays after eyelets have been set in the uppers, as shown in the successive sections (reading from left to right) of Figs. 20 and 21. Then lasts, taken from a container 38 and brought to a position near conveyor 2 by a truck 39, are placed on the trays and the latter are transferred to a conveyor 40 which carries them past a succession of work benches 41 where operators perform manually the operations of joining the parts and making up the shoe on the last. At each bench are a series of operators who perform the assembling and making steps successively and pass the work on from one to another. The numbers of shoe making benches and operators are provided in general proportion to the ratio in which the speed of dieing out the gum and transferring the various parts from the sources of supply to the conveyor is greater than the speed of joining these parts and making up the shoes.

Conveyor 40 travels at a speed fast enough and carries enough trays to keep all of the workers at the benches supplied with work. Any trays in excess of this capacity, which may travel past all of the benches, are taken by an attendant from the upper stretch of the conveyor and placed on its lower stretch whereby they are returned to the starting point.

The completed shoes are transferred from the benches 41 to a conveyor 42 which carries them to a press 43. On the way to this press, the outer soles, which have previously been laid on the lasted shoes, are properly positioned thereon by operators at a station 44. Press 43 forces the outer soles firmly on the bottoms of the shoes. Then operators at a bench 45 roll the edges of the outer soles against the sides of the uppers and the shoes are removed to a truck 46 by which they are conveyed to the vulcanizer.

In Fig. 23 is shown diagrammatically means for correlating the travel of the conveyor 2 to the operations of the dieing out press 4. The same type of control is used in connection with the apparatus first described, although it is not shown in Fig. 17. An electric motor 47 drives one of the guide rolls of the conveyor through suitable speed reducing gearing, as indicated at the top of Fig. 23. This motor is controlled by a stopping and starting switch or relay 48 which is in electrical connection through a cable 49 with a circuit closer at the dieing out press. As the press operates, it automatically opens and closes the circuit closer, causing the conveyor to remain stationary while the dies are in the stock cutting position, and to proceed while the dies are withdrawn.

The operating procedures herein disclosed, and particularly the one first described, enable the work to be carried on and completed with the greatest efficiency and economy of time and labor. It is econmoical of material in that all of the rubber scrap can be utilized in working up new stock. The continuity of the process eliminates the necessity of separate departments, booking the rubber parts after dieing out and before use, carrying separate parts of the footwear around the factory, and lapse of any appreciable time between the preparation of the rubber parts and their utilization, operations which have been usual heretofore and have been costly factors. Thus the invention has resulted in appreciable savings in labor, avoidance of loss of material due to spoilage in handling, and improvement in the quality, fit and appearance of the finished shoes. These advantages attach to the making of all types of footwear which are capable of being put through the continuous process described or an equivalent operation.

A further saving in cost of handling and avoidance of danger of injury, results from the step of dieing out the entire trim of a whole or half upper in one piece and by a single operation. The rubber composition or gum in the unvulcanized condition has little strength and less resilience, and is tacky so that pieces accidently brought together will stick, and are liable to be spoiled in the attempt to pull them apart. But when, as here, the gum trim remains in the same position on its support in which it was first died out, until the fabric of the upper has been applied to it, all such dangers as well as the cost of the provisions heretofore made to avoid them, are eliminated.

More particularly, in the type of shoe here illustrated, the expense of stitching and the handling incidental to stitching, heretofore inevitable, have been wholly or nearly eliminated. At the same time the bond between the trim and the fabric is fully as strong as that obtained by stitches, if not stronger. Indeed the bond created between the rubber trim and the fabric makes possible the use of some fabrics in this association which cannot be satisfactorily united by stitching, such as the open mesh fabric of the upper a' shown in Fig. 8 of the drawings, and soft or sleazy fabrics. The bond created by the rubber residuum of dried latex is presumably analogous to a myriad of tentacles, which, after vulcanization, are essentially homogeneous with the rubber trim and penetrate into the very body of the fabric, not merely between the strands or yarns of the fabric, but around and into the strands themselves and around the individual fibers thereof. The tensile strength of these myriad tentacles and not merely surface adhesion to the fabric is thus made available for the bond.

The one piece trim, when vulcanized, makes a frame having substantial strength and rigidity in itself sufficient to hold the upper in shape and support the fabric through the medium of the improved bond. The same factors make it possible to dispense with the lining ply which has heretofore been a practical necessity in rubber trimmed shoe uppers. However, I prefer to apply to such open mesh upper an inside facing of firm, strong fabric over the same areas which are covered by the gum trim. The inside facing is preferably first covered with adhesive compound which, passing through the meshes of the fabric, unites with the adhesive compound on the under side of the trim and, after vulcanization, makes a strong cohesive rubber bond comparable in strength to homogeneous vulcanized rubber. Such a facing along the lacing edges of the upper provides also a stronger anchorage for the eyelets. However, it is a useful adjunct rather than an essential feature of the shoe and may be omitted within the operative scope of the invention and the protection which I claim.

Although I have stated herein a preference for a base of sheeting fabric on the gum trim, I wish to say that such base may be omitted and the gum applied directly to the fabric of the upper. In that case the coating above described as applied to the surface of the sheeting base may be omitted and the gum trim united directly to the rubber content of the upper fabric. The claimed invention is not limited, in its broadest aspects, either to the use of a sheeting base on the rubber trim, or to the use of cement between the trim and the upper fabric whether or not such base is employed.

What I claim and desire to secure by Letters Patent is:

1. An article of footwear having a fabric upper and a skeleton trim of rubber composition, the elements of which are integral parts of the same original piece, in bonded connection with the fabric.

2. An article of footwear having a rubber trimmed fabric upper in which the fabric constituent is formed with open meshes of relatively large size and the rubber trim is a skeleton composed of members of the same original piece in integral union with one another and bonded to the fabric.

3. A rubber trimmed shoe having a textile fabric upper, a vulcanized rubber trim, and a sole; such trim being composed of members extending along the boundaries of the upper in integral union with one another, but otherwise disposed to leave uncovered relatively large areas of the fabric, and being intimately bonded to the fabric; constituting a skeleton or frame having substantial structural strength and supporting stiffness.

4. An article of footwear having a rubber trimmed fabric upper, the rubber trimming having a backing or base of fabric incorporated in one surface thereof and being applied with said surface next to the fabric part of the upper, an adhesive compound of rubber between said trimming and fabric free from fatty acids and the fabric containing the residue of a rubber treatment in those parts thereof overlaid by the trimming; said trimming, backing fabric, cement and rubber residue being in vulcanized union with one another.

5. An article of footwear having a rubber sole and a rubber trimmed fabric upper, said upper being rubber treated in the parts overlaid by the rubber trimming, and the trimming being of sheet rubber composition having in intimate union with one surface a rubber-impregnated fabric base, said base being in contact with the fabric, and all being vulcanized together.

6. The method of making rubber trimmed fabric footwear which consists in providing a sheet of rubber having an impregnated sheet of fabric on one face, and carrying on the outer side of such fabric sheet a layer of adhesive rubber compound containing a low temperature accelerator and from which fatty acids have been eliminated, separately providing a shoe upper of non-rubber fabric and introducing rubber into the interstices thereof, and then placing and pressing the fabric and rubber trimming together with the coated side of the rubber against the fabric, and vulcanizing them.

7. The method of making a rubber trimmed fabric shoe upper which consists in dieing out the parts of the trimming material from a sheet of stock containing unvulcanized rubber composition, removing the scrap parts of such sheet from the trimming parts while the latter remain substantially in original position, laying on said trimming parts a shoe upper blank cut from non-rubber fabric which has previously been treated with rubber, and vulcanizing together the trimming material and the rubber contained in the fabric.

8. The method of preparing uppers for footwear which consists in dieing out, in one operation, from a sheet of stock consisting mainly of unvulcanized rubber composition, all the parts constituting the rubber trim of the upper of a prescribed article of footwear, removing waste parts of the stock sheet from the useful trimming parts while the latter remain in substantially their original relationship to one another, laying a cut out upper blank of non-rubber fabric which has previously been treated with rubber against said trimming parts, pressing the fabric and trimming parts forcibly together, assembling the composite upper so produced with other rubber-containing parts of the footwear article, and vulcanizing the article.

9. The method of making rubber footwear having rubber trimmed fabric uppers which consists in dieing out in a single operation, from a sheet of stock consisting mainly of unvulcanized rubber composition, the rubber trimming parts of a shoe upper and also a junior or counter stiffener and a toe cap for such upper, removing the waste parts of the sheet from the useful parts without disturbing the latter, taking the junior and laying it on that part of the cut out trimming material which covers the rear of the upper, laying a fabric upper blank which has previously been treated with rubber on the trimming parts in the relationship prescribed by the design of the shoe, placing a rubber treated fabric tongue and said toe cap together so that the toe cap covers that part of the tongue which is to be formed into the toe of the shoe, separately forming the composite fabric upper and rubber trimming material under pressure, forming the toe cap and tongue under pressure, lasting the thus formed composite structures together with each other and an inner sole, laying an outer sole on the bottom of the so lasted shoe, and vulcanizing the shoe.

10. The method of making a succession of rubber trimmed shoes in a continuous process which consists in leading an elongated sheet of stock consisting mainly of unvulcanized rubber composition upon a traveling conveyor, placing trays or boards successively beneath said sheet on the conveyor, forwarding said trays and the superposed sheet to a dieing out station, cutting the sheet at said station successively on each tray along the outlines of the rubber trimming or covering parts of a fabric shoe upper, forwarding the trays successively to a waste-removing station, there removing waste parts of the stock sheet from the useful trimming parts while the latter remain undisturbed on the trays, applying fabric shoe upper blanks to the trimming parts, forming the fabric and rubber parts so combined under pressure, and lasting the formed parts with related parts to make a shoe, and vulcanizing the lasted shoe.

11. The method of assembling parts to form footwear elements which comprises feeding sheet material composed essentially of vulcanizable rubber composition, cutting out and removing from said material waste parts while leaving substantially undisturbed a plurality of rubber parts useful for such footwear elements, and superposing on said useful rubber parts the fabric member of the footwear element under construction.

12. The method of assembling parts to form footwear elements which comprises feeding sheet stock comprising essentially vulcanizable rubber composition over a supporting member, cutting from said sheet stock on said support material in the outlines of the rubber parts to be used in such an element and removing from the support the waste portions of the stock, providing a sheet of rubber-treated fabric from which fabric constituents of such footwear elements have been partially severed, removing such fabric elements from the last named sheet and superposing each singly upon the cut out rubber parts of a footwear element on such support, and advancing the assembled element for further treatment.

13. The method of assembling parts to form footwear elements which comprises feeding sheet stock comprising essentially vulcanizable rubber composition over a supporting member, cutting from said sheet stock on said support material in the outlines of the rubber parts to be used in such an element and removing from the support the waste portions of the stock, providing a sheet of rubber-treated fabric from which fabric constituents of such footwear elements have been partially severed, removing such fabric elements from the last named sheet and superposing each singly upon the cut out rubber parts of a footwear element on such support, and pressing the said fabric and rubber parts forcibly together.

14. The method of constructing footwear which consists in cutting out from sheet gum certain rubber parts of an article of footwear on a traveling conveyor, advancing said parts, without disturbing their relationship to one another, by means of the conveyor to a succession of stations, adding other parts of the footwear and performing successive steps of the footwear assemblage at successive ones of said stations, and placing on the conveyor one after the other a succession of corresponding parts of different footwear articles to be carried through the same series of stations.

15. The method of making a composite textile fabric and rubber shoe upper which consists in dieing out in one operation from a sheet of vulcanizable rubber stock the rubber trimming parts of such shoe upper, removing the waste portions of the stock sheet while leaving the useful parts in undisturbed relationship to one another, placing the complemental rubber treated fabric part of such upper on the said remaining useful pieces while the latter retain the same relationship, in a prescribed registry therewith, and pressing the rubber and fabric parts together into adherent union.

16. The method of producing a rubber trimmed shoe upper which consists in dieing out from a sheet of vulcanizable rubber stock, in one operation, the trimming parts of such upper, removing the waste stock from such parts without disturbing their relationship to one another, applying the fabric part of the upper to said trimming parts in registry therewith and pressing the rubber and fabric parts together.

17. In the manufacture of rubber trimmed footwear, the steps of cutting out from a sheet of suitable gum stock the rubber trimming parts in the relationship to one another prescribed for the footwear, removing waste parts of the gum from the useful parts without disturbing the relationship of the latter, laying the corresponding fabric part of the upper on said trimming parts in registry therewith, and combining the so assembled parts of the upper with other parts in the complete article.

18. An article of manufacture comprising a plurality of layers of fabric held together by cementitious material and a deposit of initially plastic material covering a definitely limited area of the face of the fabric and adhered thereto over said area, and united by rubber extending through interstices in the adjacent layer of fabric to the intervening cementitious material.

ERNEST W. DUNBAR.